B. Wise,

Ice Elevator.

N° 36,121.                    Patented Apr. 5, 1862.

Witnesses:
Francis Millward
And. D. O'Neill

Inventor:
Bernard Wise
by Knight Bros Attys

UNITED STATES PATENT OFFICE.

BERNARD WISE, OF CINCINNATI, OHIO.

IMPROVEMENT IN HOUSING AND SHIPPING ICE.

Specification forming part of Letters Patent No. 36,121, dated August 5, 1862.

*To all whom it may concern:*

Be it known that I, BERNARD WISE, of Cincinnati, Hamilton county, Ohio, have invented a new and useful Improvement in Machines for Housing and Shipping Ice; and I do hereby declare the following to be a full, clear, and exact description of the nature, construction, and operation thereof, reference being had to the annexed drawings, making part of this specification.

The present invention relates to a provision for the expeditious loading and unloading of ice.

Figure 1:
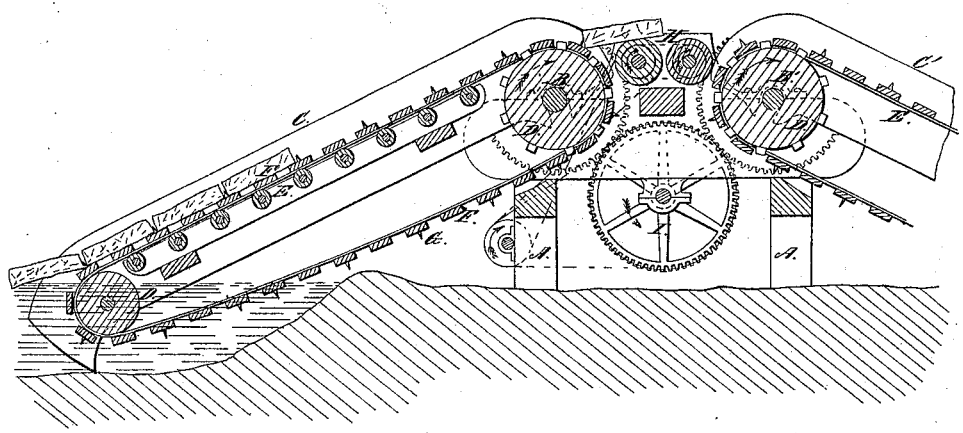
Figure 2:
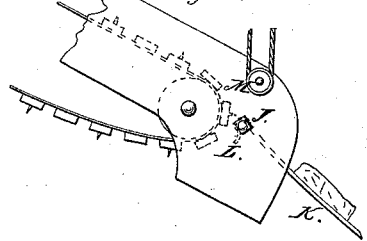

Figure 1 is a longitudinal section through a machine which embodies my invention. Fig. 2 represents by side elevation the foot of one of the causeways.

A is a frame about equal in height to the ice-house.

B B' are shafts which form hinge attachments for inclined and adjustable causeways C C'. Pulleys D D', of which the upper one is fixed to the shaft B or B' and the lower one is journaled at the lower extremity of the causeway, support an endless belt or carrier composed of two endless chains or bands, E, (one seen,) united by slats F. Some of the slats are armed with spikes G.

Journaled to the frame A between the pulleys D D', and with the upper sides of their peripheries on a level with those of the endless carriers, are two or more rollers, H. The number and distance of said rollers should correspond to the intended size of the ice.

The entire set of rollers and pulleys just described are caused to revolve simultaneously, either in a forward or backward direction, by means of suitable driving mechanism, I. The direction of rotation indicated by the red arrows is that employed for housing the ice. For unhousing or shipping the ice the motion is of course reversed.

Fig. 2 represents the foot of what is for the time being the discharging-causeway. J is a rod which extends from side to side of the causeway.

K is a chute formed of a plate of boiler-iron. One edge of this plate is furnished with hooks L, which engage over the rods K. This chute serves to deliver the ice from the endless belt into the ice-house, barge, or wagon, as the case may be.

M represents part of a hoisting-tackle for elevating the foot of the causeway to the proper level as the house or other receptacle becomes charged with ice.

It will be seen that the hinged attachment of the causeways to the frame adapts them to be adjusted to whatever height and inclination circumstances may require.

This machine is capable of housing and unhousing ice with any desired rapidity, and when both causeways become loaded, the descending portion balancing that on the ascending side, the machine nearly works itself, and, indeed, quite so in unloading to a lower level.

I claim herein as new and of my invention—

1. The arrangement of inclined and adjustable causeways C C', endless carriers E F G, and rollers H, the whole being combined and operating together, substantially as set forth.

2. In the described connection with the adjustable causeway C, the hinged and self-adjusting discharging-chute J K, operating as set forth.

In testimony of which invention I hereunto set my hand.

B. WISE.

Witnesses:
FRANCIS MILLWARD,
E. L. SHANNON, Jr.